United States Patent [19]

Lucas

[11] 4,232,502
[45] Nov. 11, 1980

[54] METHOD OF MAKING A DRINKING CUP AND CONTAINER

[76] Inventor: Paul A. Lucas, 2605 St. Clair Ave., East Liverpool, Ohio 43920

[21] Appl. No.: 948,893

[22] Filed: Oct. 5, 1978

Related U.S. Application Data

[63] Continuation-in-part of Ser. No. 811,432, Jun. 29, 1977, Pat. No. 4,134,492.

[51] Int. Cl.³ ............... A23L 29/02; B65D 77/00; B29C 17/08; B65B 47/00
[52] U.S. Cl. ............................... 53/453; 156/213; 206/217; 426/86
[58] Field of Search ............... 156/213, 214, 228; 53/453; 264/554; 206/217; 426/86

[56] References Cited

U.S. PATENT DOCUMENTS

| 2,062,897 | 12/1936 | Michel et al. ............... 426/86 |
| 2,328,798 | 9/1943 | Gardner . |
| 3,052,371 | 9/1962 | Van Bemmelen . |
| 3,608,016 | 9/1971 | Holmström et al. ............... 264/554 |
| 3,743,520 | 7/1973 | Croner ............... 426/86 |
| 4,040,561 | 8/1977 | Philippon ............... 206/217 |

Primary Examiner—John T. Goolkasian
Assistant Examiner—L. Falasco
Attorney, Agent, or Firm—Webster B. Harpman

[57] ABSTRACT

A drinking cup and container for a beverage concentrate is made by shaping a piece of thin plastic film on a shaped form by a vacuum to form a shaped lining including one or more compartments, positioning a beverage concentrate or the like in said compartments and sealingly affixing an inverted expendible cup thereover and releasing said assembly from said shaped form.

7 Claims, 3 Drawing Figures

METHOD OF MAKING A DRINKING CUP AND CONTAINER

This is a continuation in part of application Ser. No. 811,432, filed June 29, 1977 now U.S. Pat. No. 4,134,492.

BACKGROUND OF THE INVENTION

(1) Field of the Invention

This invention relates to expendible cups wherein a beverage concentrate or the like such as an instant coffee product is packaged by a closure and the method of making the same.

(2) Description of the Prior Art

Prior articles of the type produced by the hereindescribed invention have employed cup-like containers and various means for retaining a beverage concentrate or the like therein. See for example U.S. Pat. No. 2,062,897 wherein a pair of rigid cups form a container therebetween, U.S. Pat. No. 2,328,798 wherein a method of attaching a non-removable liner in a container is disclosed, and U.S. Pat. No. 3,052,371 wherein a container having several compartments therein is disclosed.

The present invention discloses a novel method of shaping a thin flexible plastic film liner over a shaping form by moving the same there-against by a partial vacuum from within the shaping form, holding the shaped liner while a desirable beverage concentrate is positioned in one or more compartments formed in the uppermost portion of the shaped liner and then positioning an inverted expendible cup thereover and securing the same thereto in sealing relation to form an expendible cup and beverage concentrate which is readily usable by removable of the substantially unattached liner. Portions of the liner may extend over the outer surface of the expendible cup to insure the cleanliness thereof.

SUMMARY OF THE INVENTION

A method of making a drinking cup and container is disclosed which utilizes a novel step of shaping a thin flexible plastic film over a shaped form with pocket-like depressions in its upper end and outwardly and downwardly tapering side walls so that the shaped liner thereon defines compartments in which a beverage concentrate or several different materials such as coffee concentrate, dry creamer, and sugar may be positioned and an inverted expendible drinking cup positioned thereover in sealing relation to the area of the shaped liner about the compartments whereupon removal of the expendible cup and liner produces the drinking cup and container of the invention.

DESCRIPTION OF THE PREFERRED EMBODIMENT

Figure 3:
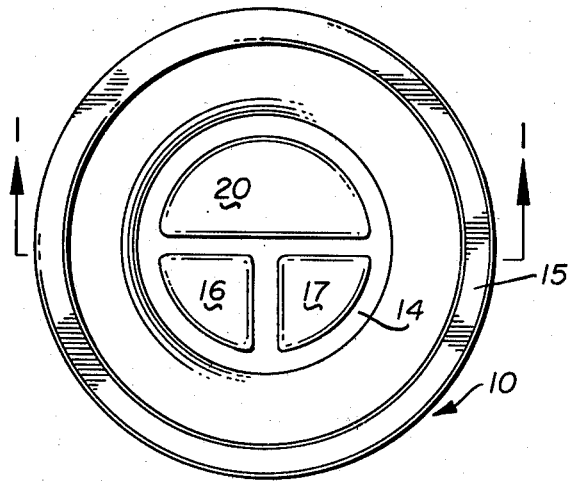
FIG. 3 is a top plan view of the drinking cup and container seen in FIG. 1. Section lines 1—1 on FIG. 3 indicate the section of FIG. 1.
Figure 1:
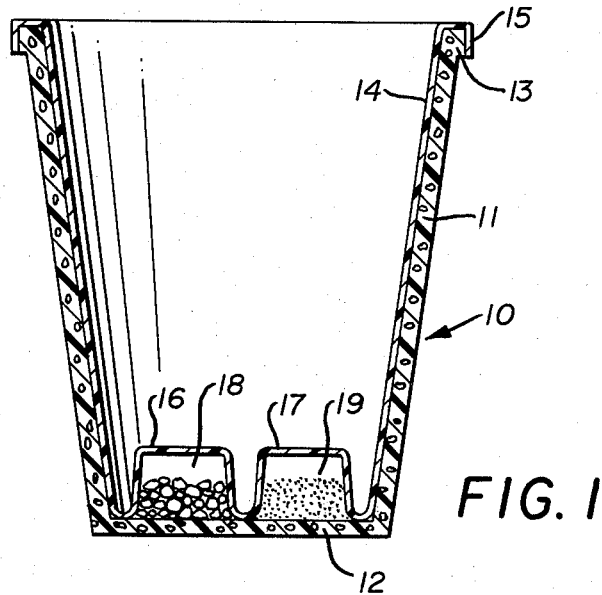
FIG. 1 is a vertical section through a drinking cup and container formed in accordance with the method herein disclosed.

By referring to the drawings and FIGS. 1 and 3 in particular it will be seen that an expendible drinking cup 10 such as may be formed of expanded polystyrene or the like as a single integral molded article includes a circular side wall 11, a bottom 12 and a rim 13. A section 14 of very thin flexible plastic film such as polyethylene or the like, incapable of self support or shape retention, is positioned in the cup 10 with its outermost portions 15 overlying the rim 13 of the cup and extending over the outer surface of the rim 13 thereof.. The innermost or bottom portion of the film 14 has one or more portions 16 and 17 thereof spaced with respect to the bottom 12 of the cup so as to enclose a beverage concentrate or the like as indicated by the numerals 18 and 19 in FIG. 1 of the drawings.

In FIG. 3 of the drawings, a top plan view of the disposable drinking cup and container of FIG. 1 may be seen and it will be observed that three compartments 16, 17 and 20 are shown in the bottom of the film 14 and that three different substances such as coffee, creamer, and sweetener are disposed therein.

Figure 2:
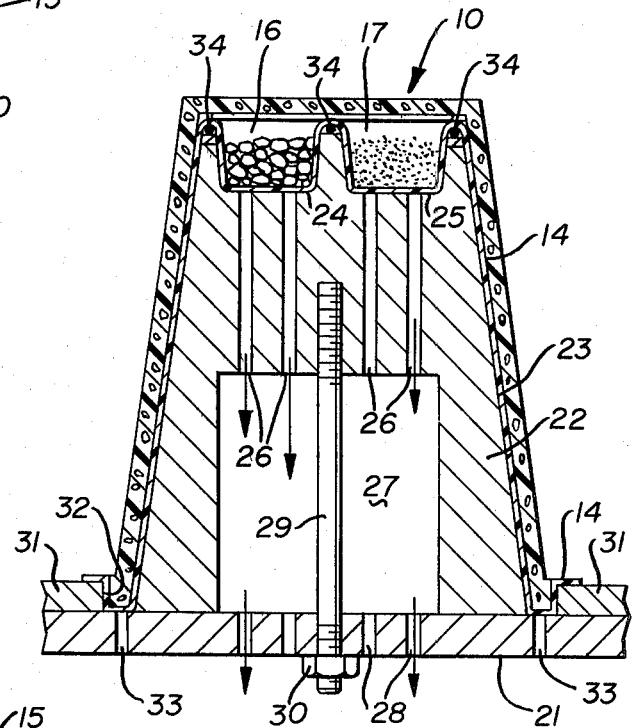
FIG. 2 is a vertical section through a shaping form showing vacuum passageways therein and a sheet of flexible material and an expendible cup positioned thereover.

By referring now to FIG. 2 of the drawings, the method of making the expendible drinking cup and container seen in FIGS. 1 and 3 and hereinbefore described, may be seen. In FIG. 2 of the drawings, a base 21 has a shaping form 22 mounted thereon, the outer surface of the shaping form 22 is semi-conical tapering upward and inwardly as at 23 and the uppermost portion of the shaping form 22 has a plurality of depressions 24 and 25 formed downwardly therein. Communicating passageways 26 extend from the bottom of the depressions 24 and 25 to a chamber 27 within the shaping form 22 and secondary communicating passgeways 28 extend through the base 21 to establish communication with the chamber 27 and a source of negative air pressure such as a vacuum machine, not shown. A bolt 29 engaged in the shaping form 22 passes through an opening in the base 21 and a nut 30 holds the shaping form 22 in desirable position. A secondary base 31 has an annular cutaway section 32 therein which is spaced radially with respect to the lowermost portion of the shaping form 22 so as to form an annular groove. Additional passageways 33 are positioned through the base 21 and communicate with the annular groove formed by the inner surface of the secondary base 31 and the lower annular portion of the shaping form 22 and are adapted to communicate with the vacuum machine hereinbefore referred to.

Still referring to FIG. 2 of the drawings, it will be seen that a section of a very thin flexible film 14 has been positioned over the shaping form 22, the vacuum machine operated so that the film 14 is pulled inwardly and downwardly against the outer surfaces of the shaping form 22 and into the grove formed between the secondary base 31 and the lower annular portion of the shaping form 22.

As shown in FIG. 2 of the drawings, the edges of the film 14 are positioned on an outturned plane above the secondary base 31 and it will occur to those skilled in the art that by increasing the height of the secondary base 31, the film 14 can be shaped upwardly alongside the annular cutaway portion thereof to a greater height than that illustrated.

When the film 14 has been moved into the position shown in FIG. 2 by operation of the vacuum machine, the desirable beverage concentrate, such as instant coffee, powdered fruit drink, or dry creamer and sugar or the like, can be positioned in one or more compartments 16 and 17 formed in the film 14 where it is drawn into the depressions 24 and 25, etc. An expendible cup 10 is then inverted and positioned over the shaped film 14 and the beverage concentrate in the compartments 16 and 17, etc. and temporarily heat sealed to the film 14 about the depressions 24-25 by a heating element 34 which is positioned in the form 22. The film 14 may also be sealed to the cup 10 about the depressions 24 and 25 and the outside of the cup by applying an adhesive thereto before the inverted cup 10 is positioned over the shaped film 14. A commercially available "polyethylene label adhesive" manufactured by the 3M Company of Minneapolis, Minnesota is one of several such suitable adhesives. The film 14 is shaped to form an annular rim where it overlies the uppermost annular edge of the shaping form 22. If desired a similar shaping and attachment can be used to secure the edges of the film 14 about the outer surfaces of the cup 10 in the areas adjacent the rim thereof so as to provide a protective covering therefor.

After the expendible cup 10 has been positioned and secured, as seen in FIG. 2 of the drawings and hereinbefore described, the vacuum machine is stopped or the lines communicating therewith opened to the atmosphere whereupon the assembled expendible drinking cup and container complete with the beverage concentrate or the like may be removed and packed for shipment. The method herein disclosed may be varied by heating the film 14 prior to or during its shaping on the shaping form 22. The shaping of the film 14 may also be from the exterior, as by pressure applied to the film.

In order to use the drinking cup and container, the peripheral edge of the film 14 is grasped and the unattached liner formed of the film 14 is pulled out of the cup which is then in upright position thus leaving the beverage concentrate in the bottom of the cup and the addition of hot or cold water or other liquid enables the desired beverage to be reconstituted in the cup.

Those skilled in the art will observe that the method of making a drinking cup and container disclosed herein results in an inexpensively formed combination drinking cup and beverage concentrate or the like and it is obvious that the cup may take shapes other than those specifically disclosed herein and that the beverage concentrate may include soft drinks as well as soups and cereals and other food products which become usable attractive articles of consumption upon being mixed with hot or cold water, milk or other liquid. Individual doses of medicine may also be packed in place of the beverage concentrates or the like.

Although but one embodiment of the present invention has been illustrated and described, it will be apparent to those skilled in the art that various changes and modifications may be made therein without departing from the spirit of the invention and having thus described my invention what I claim is:

1. The method of making a drinking cup and container comprising positioning a piece of thin flexible plastic film over a shaping form of a predetermined shape incorporating at least one depression in the outer surfaces thereof, moving the film into close engagement with said outer surfaces of said shaping form, positioning a beverage concentrate or the like in at least one of the depressions defined in said film by said depressions in said shaping form, positioning an expendible cup thereover in sealing relation thereto and removing the excess film around the outside of said cup so that said film forms a liner in said cup with said depressions and said beverage concentrate in the normal bottom of said cup when the same is in upright position.

2. The method of making a drinking cup and container set forth in claim 1 and wherein said film is moved into close engagement with said shaping form by applying a partial vacuum to the inner surfaces of said film.

3. The method of making a drinking cup and container set forth in claim 1 and wherein said film is held in said engagement with said shaping form while said beverage concentrate is positioned in said depressions in said film.

4. The method of making a drinking cup and container set forth in claim 1 and wherein said sealing engagement between said cup and said film is obtained by applying an adhesive to the outer surface of said film around said depressions therein.

5. The method of making a drinking cup and container set forth in claim 1 and wherein said sealing engagement between said cup and said film is obtained by applying an adhesive to the outer surface of said film around said depressions therein and to the outer surfaces of said film around the outside of said cup.

6. The method of making a drinking cup and container set forth in claim 1 and wherein said film is moved into close engagement with said shaping form by heating the film and applying pressure to the exterior thereof.

7. The method of making a drinking cup and container set forth in claim 1 and wherein said film is heated in the areas thereof around said depressions so as to thermally attach said film to said cup.

* * * * *